US010160661B2

(12) United States Patent
Gregory

(10) Patent No.: US 10,160,661 B2
(45) Date of Patent: Dec. 25, 2018

(54) PORTABLE, DUAL-ORIFICE FILTERED WATER DISPENSER

(71) Applicant: Dylan Gregory, Salt Lake City, UT (US)

(72) Inventor: Dylan Gregory, Salt Lake City, UT (US)

(*) Notice: Subject to any disclaimer, the term of this patent is extended or adjusted under 35 U.S.C. 154(b) by 8 days.

(21) Appl. No.: 15/242,076

(22) Filed: Aug. 19, 2016

(65) Prior Publication Data

US 2018/0050925 A1  Feb. 22, 2018

(51) Int. Cl.
| | | |
|---|---|---|
| C02F 1/00 | (2006.01) |
| B65D 1/06 | (2006.01) |
| B65D 1/02 | (2006.01) |
| B65D 35/00 | (2006.01) |
| B65D 41/04 | (2006.01) |
| B65D 51/24 | (2006.01) |
| B65D 55/14 | (2006.01) |

(52) U.S. Cl.
CPC ............ *C02F 1/002* (2013.01); *B65D 1/0246* (2013.01); *B65D 1/06* (2013.01); *B65D 35/00* (2013.01); *B65D 41/0442* (2013.01); *B65D 51/24* (2013.01); *B65D 55/14* (2013.01); *C02F 2307/02* (2013.01)

(58) Field of Classification Search
CPC .... C02F 1/002; C02F 2307/02; B65D 1/0246; B65D 1/06
See application file for complete search history.

(56) References Cited

U.S. PATENT DOCUMENTS

| | | | | |
|---|---|---|---|---|
| 2010/0170839 A1* | 7/2010 | Kohl | ........................ | C02F 1/002 210/232 |
| 2010/0187183 A1* | 7/2010 | Nelson | .................... | C02F 1/002 210/741 |
| 2012/0261322 A1* | 10/2012 | Yang | ........................ | C02F 1/002 210/232 |
| 2013/0037426 A1* | 2/2013 | Shen | .................. | B65D 21/0204 206/216 |
| 2016/0031719 A1* | 2/2016 | Yang | ........................ | C02F 1/002 210/416.3 |
| 2017/0007010 A1* | 1/2017 | Dybvig | .................... | A45F 3/16 |
| 2017/0240449 A1* | 8/2017 | Barlow | ................ | B01D 61/145 |

* cited by examiner

*Primary Examiner* — Ryan A Reis
(74) *Attorney, Agent, or Firm* — Steven Rinehart

(57) ABSTRACT

A portable water-filtering and storage dispenser is provided with twin orifices at top and bottom, the top orifice for dispensing water to a user for consumption, the bottom orifice for receiving water for filtration and storage. Water received via the bottom orifice is filtered by a dome filter and keyway insert. Both orifices are sealable with detachable caps for threadably mating with the body of the dispenser.

8 Claims, 7 Drawing Sheets

600

700

720

PORTABLE, DUAL-ORIFICE FILTERED WATER DISPENSER

BACKGROUND OF THE INVENTION

Field of the Invention

This invention relates to water dispensers and more particularly to refillable, portable water filtration systems.

Description of the Related Art

The market for purified drinking water is growing as tap water becomes more polluted and the risks of carcinogens and other toxins in tap water become more well-known and better researched.

Water dispensers in the art typically have comprised of plastic necked water bottles mounted in place in a convex mounts or portable containers with inefficient filtration systems. In stationary dispensers, water is dispensed using gravity to produce water outflow from a nozzle affixed to the mount. As water is drawn, the water level falls until the bottle is empty.

Both stationary and portable water dispensers have become a fixture in modern society. Replacing filters however, or removing them from portable bottles, can be laborious and inconvenient during frequent usage. Some systems for purifying drinking water have required a pressurized supply of water to force the water through a filter Although water treatment systems have been available for years, there exists no efficient means of filtering water and quickly accessing it from a portable dispenser. These inefficiencies have lead many consumers to purchase nonrefillable bottles with purified water in bulk for consumption.

SUMMARY OF THE INVENTION

From the foregoing discussion, it should be apparent that a need exists for a portable, dual orifice filtered water dispenser. Beneficially, such an apparatus would overcome many of the difficulties and safety concerns expressed, by providing an efficient means of filtering, storing and accessing filtered water.

The present invention has been developed in response to the problems and needs in the art that have not yet been fully solved by currently available apparati and methods. Accordingly, the present invention has been developed to provide a portable water dispenser, the water dispenser comprising: a transparent cylindrical bottle member defining two open ends having a threaded top, a threaded bottom, and a first diameter, the cylindrical bottle member narrowing at the threaded top and the threaded bottom; wherein the cylindrical bottle member narrows to a second diameter less than the first diameter at the threaded bottom; wherein the cylindrical bottle member narrows to a third diameter less than both the first diameter and the second diameter at the threaded top; a top cap for engaging the threaded top and for closing one of the two open ends; a dome-shaped water filter; a cylindrical keyway insert; a water bottle gasket; and a bottom cap for engaging the threaded bottom, the bottom cap defining a hollow recess for cupping the dome-shaped water filter, the keyway insert, and the water bottle gasket; wherein the threaded-bottom is detachable for introduction of unfiltered water to the water dispenser; wherein each of the dome-shaped water filter, the keyway insert and the water bottle gasket are disposed between the threaded bottom and the bottom cap.

The dome-shaped filter may define a plurality of apertures for filtering water. The keyway insert may define a plurality of apertures for filtering water. The top cap may define a hollow recess for receiving the threaded top.

In various embodiments, the dome-shaped filter defines an open base end circumscribed by an annular flange, the annular flange interiorly-threaded for mating with exterior threading on an exterior of the keyway insert.

In some embodiments, the keyway insert defines an open end traversed by a cross member for engaging the fingers of a user and facilitating axial rotations and detachment of the exterior threading from the dome-shaped filter.

A second portable water dispenser is also disclosed, the water dispenser comprising: a transparent cylindrical bottle member defining two open ends having a threaded top and a threaded bottom; a top cap for engaging the threaded top and for closing one of the two open ends; a dome-shaped water filter, defining an open base end circumscribed by an annular flange, the annular flange interiorly-threaded for mating with exterior threading on an exterior of the keyway insert; a cylindrical keyway insert; a water bottle gasket; and a bottom cap for engaging the threaded bottom, the bottom cap defining a hollow recess for cupping the dome-shaped water filter, the keyway insert, and the water bottle gasket; wherein the threaded-bottom is detachable for introduction of unfiltered water to the water dispenser; wherein each of the dome-shaped water filter, the keyway insert and the water bottle gasket are disposed between the threaded bottom and the bottom cap.

In alternate embodiments, a portable water dispenser, the water dispenser comprising: a transparent cylindrical bottle member defining two open ends; a top cap; a dome-shaped water filter, defining an open base end circumscribed by an annular flange, the annular flange interiorly-threaded for mating with exterior threading on an exterior of the keyway insert; a cylindrical keyway insert; a bottom cap for engaging the threaded bottom, the bottom cap defining a hollow recess for cupping the dome-shaped water filter and the keyway insert; wherein the threaded-bottom is detachable for introduction of unfiltered water to the water dispenser; wherein each of the dome-shaped water filter, the keyway insert and the water bottle gasket are disposed between the cylindrical bottle and the bottom cap.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
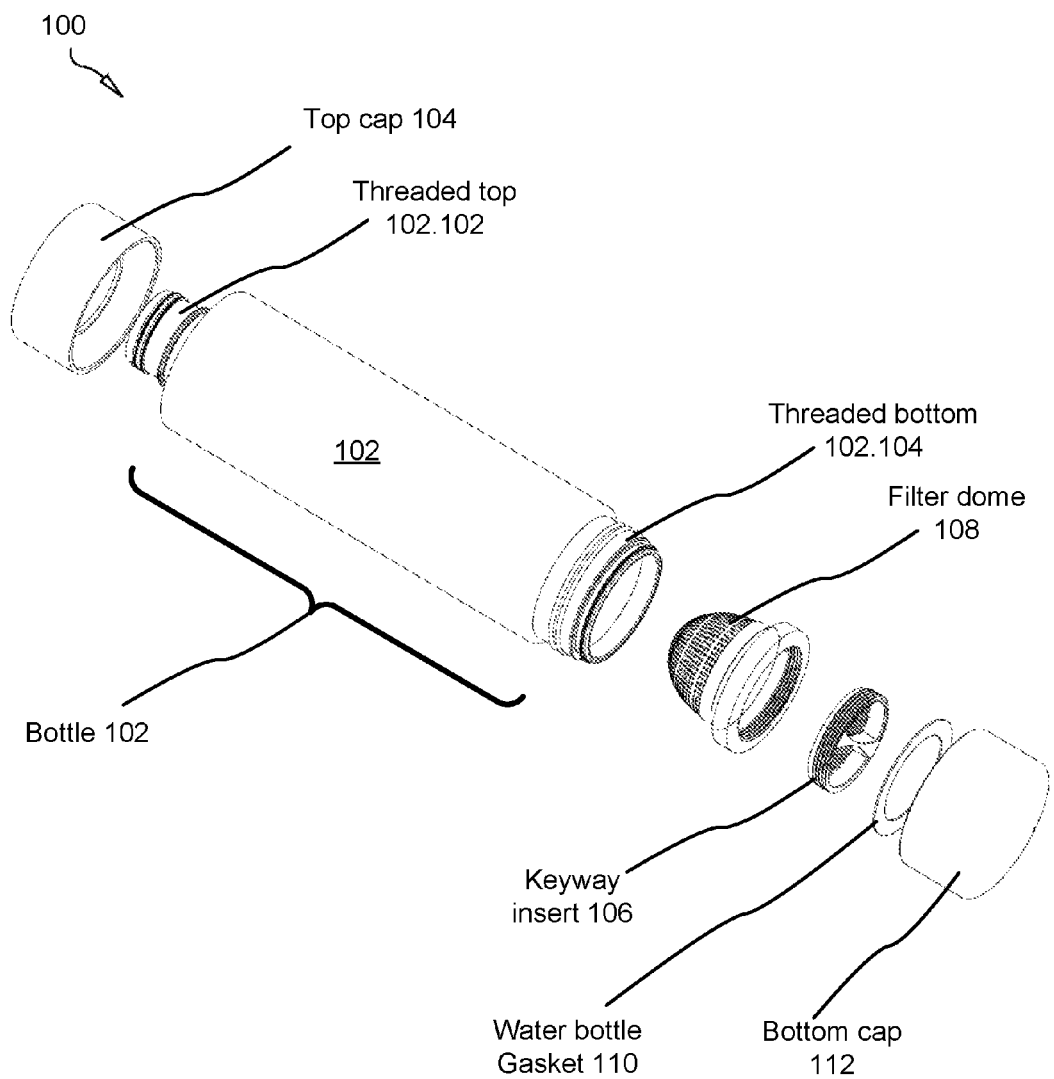
FIG. 1 is an elevational frontal-side perspective view of a portable, dual-orifice water dispenser.

FIG. 1 is an elevational frontal-side perspective view of a portable, dual-orifice water dispenser 100. The dispenser 100 comprises a top cap 104, a bottle 102 having a threaded top 102.102 and a threaded bottom 102.104, a filter dome 108, a keyway insert 106, a water bottle gasket 110, and bottom cap 112.

The bottle 102 comprises a cylindrical polymeric transparent housing defining a hollow recess traversing the bottle 102 from one open end to another. The bottle 102 defines two open ends. The first of these open ends comprises a threaded top 102.102 while the second of these open ends comprises a threaded bottom 102.104. The bottle 102 is also referred to hereinafter as the body 102.

The diameter of the threaded bottom 102.104 is larger than the diameter of the threaded top 102.102 in the preferred embodiment. Both the threaded top 102.102 and the threaded bottom 102.104 are exteriorly threaded for mating with detachable caps.

These detachable caps include a top cap 104 defining a hollow interior recess for receiving the threaded top 102.102. The top cap 104 comprises interior threading for engaging threading on the threaded top 102.102.

These detachable caps include a bottom cap 112 defining a hollow interior recess for receiving the threaded bottom 102.104. The bottom cap 112 comprises interior threading for engaging threading on the threaded bottom 102.104.

The bottle 102 typically comprises an elastomeric or polymeric material, but may comprise a metal, metal alloy, or organic material (such as leather).

In some embodiments, the top cap 104 and/or the bottom cap 112 detachably engage the bottle 102 using other means known to those of skill in the art, including clamps.

The dispenser 100 is configured to have water introduced through the bottom open end beneath the bottom cap 112. When the bottom cap 112 is removed, water may be outpoured from a facet or receptacle into the dispenser 100. This water is filtered through the filer dome 108 and the keyway insert 106 before being stored within the hollow recess of the bottle 102.

The filer dome 108, gasket 110, and the keyway insert 106 are further described below.

Figure 2A:
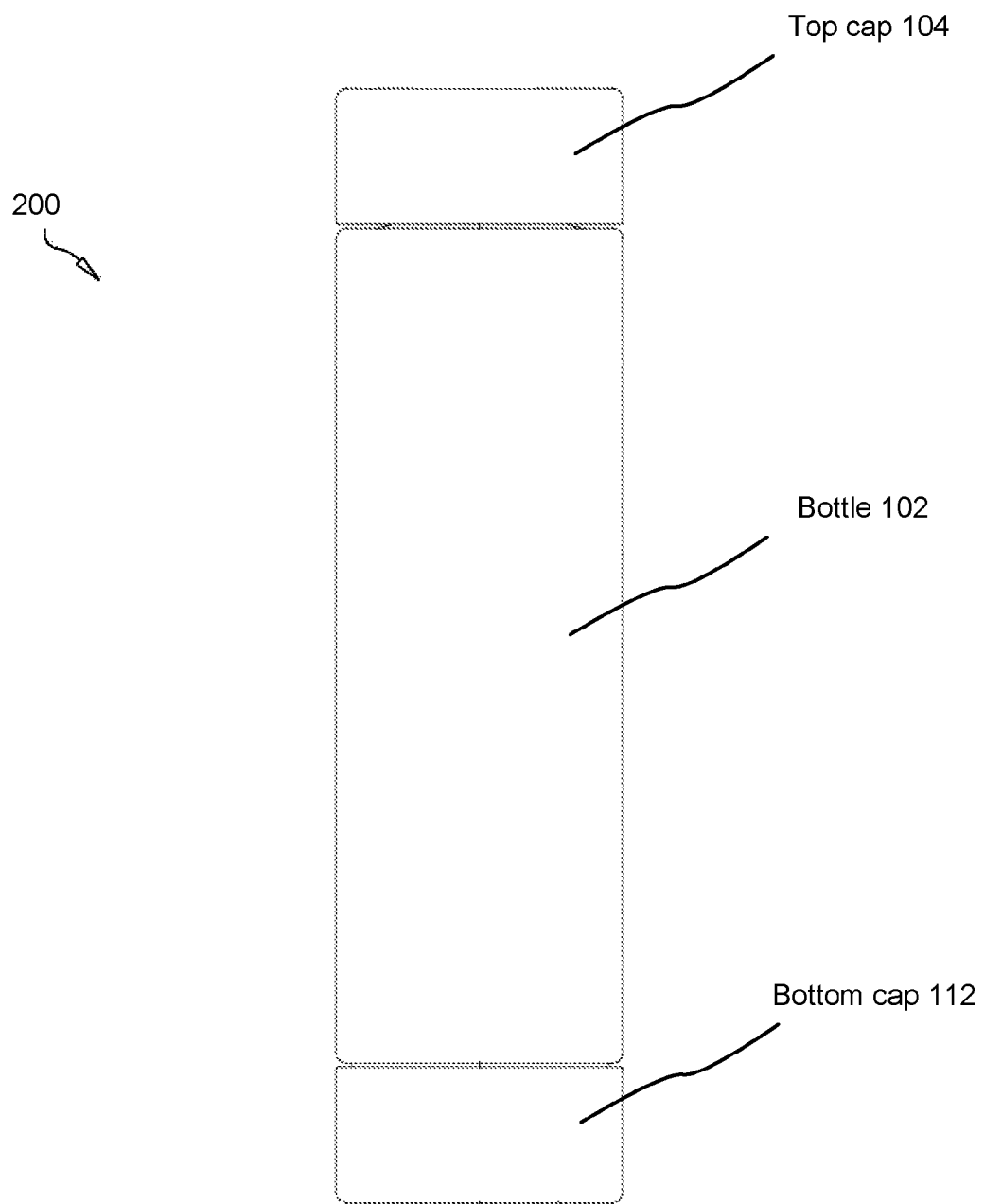
FIG. 2A is a side perspective view of a portable, dual-orifice water dispenser.
Figure 2B:
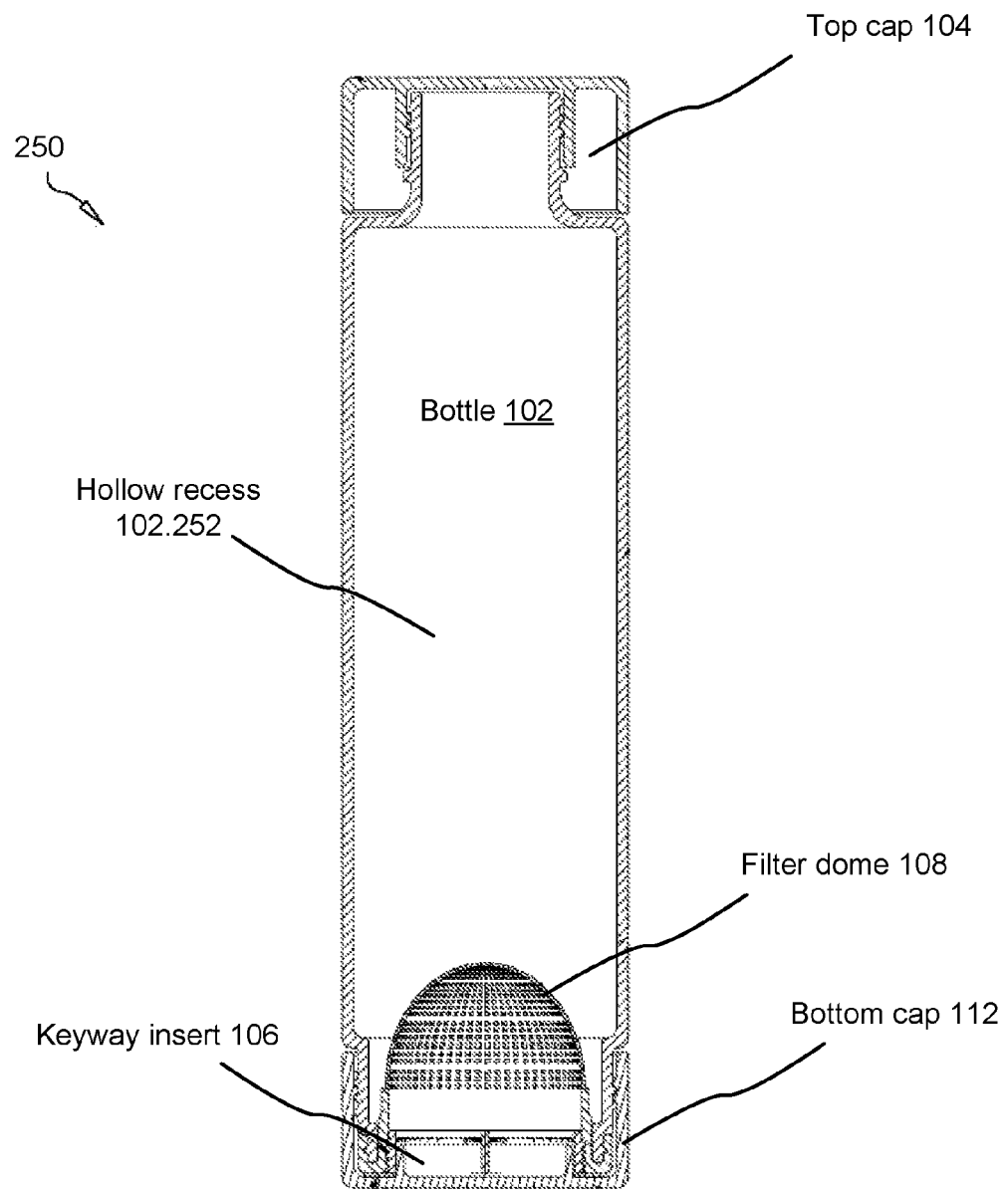
FIG. 2B is a sectioned side perspective view of a portable, dual-orifice water dispenser.

FIG. 2A is a side perspective view of a portable, dual-orifice water dispenser 200, and FIG. 2B illustrates a sectioned side perspective view of a portable, dual-orifice water dispenser 250.

As shown, the filter dome 108 is cupped by the bottom cap 112 and protrudes partially into the bottom opening of the bottle 102. The keyway insert 106 is disposed beneath the filter dome 108 (also referred to herein at the dome-shaped filter 108).

Figures 3A, 3B:
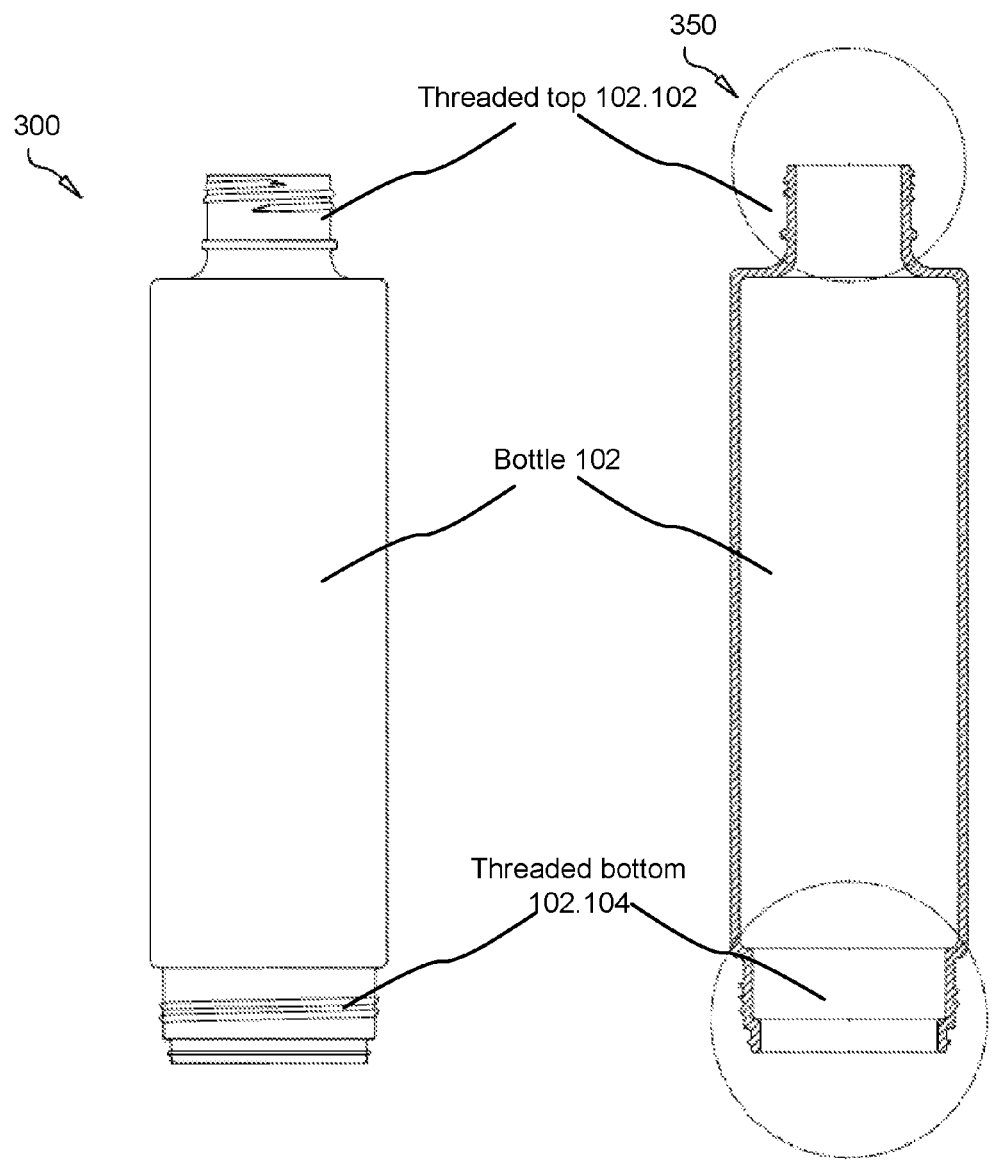
FIG. 3A is a side perspective view of a bottle of portable, dual-orifice water dispenser.
FIG. 3B is a sectioned side perspective view of a bottle of portable, dual-orifice water dispenser.

FIG. 3A is a side perspective view of a bottle 300 of portable, dual-orifice water dispenser. The bottle 300 tapers to the threaded top 102.102 at the top opening and to the threaded bottom 102.104 at the bottom opening.

FIG. 3B is a sectioned side perspective view of a bottle 350 of portable, dual-orifice water dispenser showing the contour of the hollow recess defined by the interior of the bottle 102, which hollow recess traverses the length of the bottle 102 between open ends.

Figure 4A:
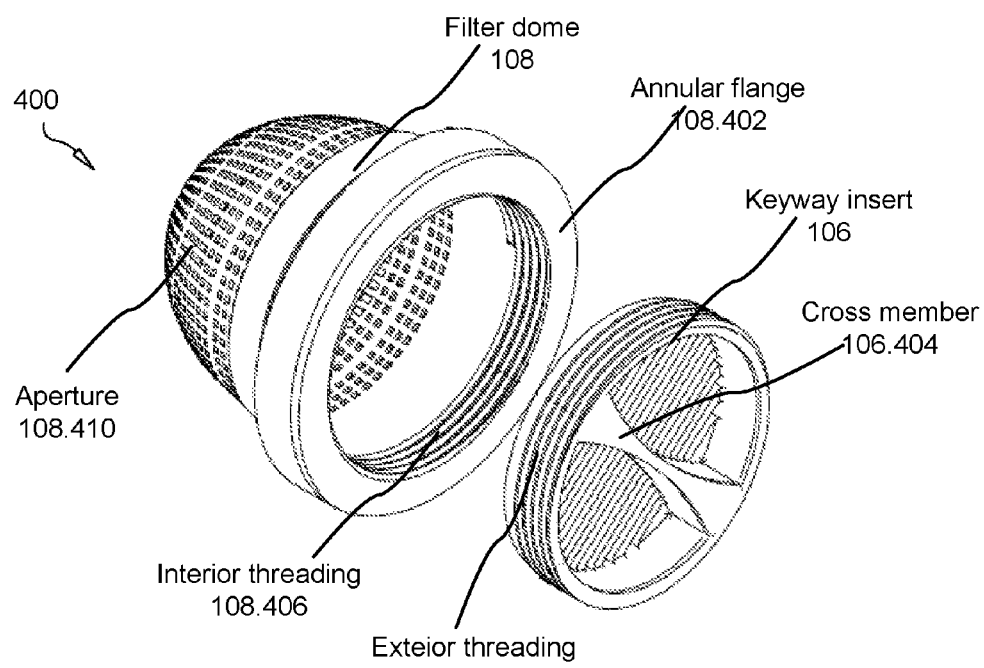
FIG. 4A is a lower side perspective view of a filter dome and keyway insert of portable, dual-orifice water dispenser.

FIG. 4A is a lower side perspective view of a filter dome and keyway insert 400 of portable, dual-orifice water dispenser. The filter dome 400 defines an open end circumscribed by an annular flange 402. The annular flange 108.402 comprises interior threading 108.406 for mating with exterior threading on the exterior of the keyway insert 106.408.

In various embodiments, the keyway insert 106 comprises a cross member 106.404 which traverses an open end at the base of the keyway insert 106 for engaging the fingers of a user attempting to mate the exterior threading 106.408 with the interior threading 108.406 of the filter dome 108 (also called a dome-shaped filter 108).

The filter dome 108 may define a plurality of apertures 108.410 in a strainer type arrangement. These apertures 108.410 may be oriented in symmetrical, repeating patterns in a plurality of tier circumscribing the filter dome 108.

The filter dome 108 and/or the keyway insert 106 may be fashioned from nylon, metals, metal alloys or organic materials.

Figure 4B:
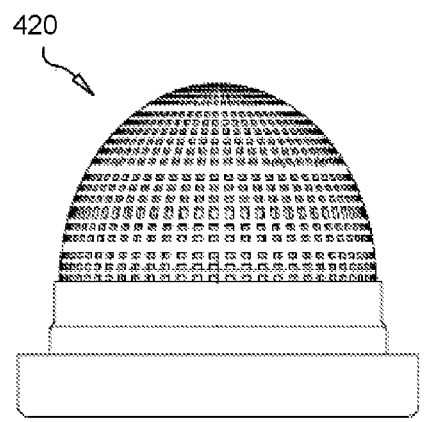
FIG. 4B is a side perspective view of a filter dome of portable, dual-orifice water dispenser.
Figure 4C:
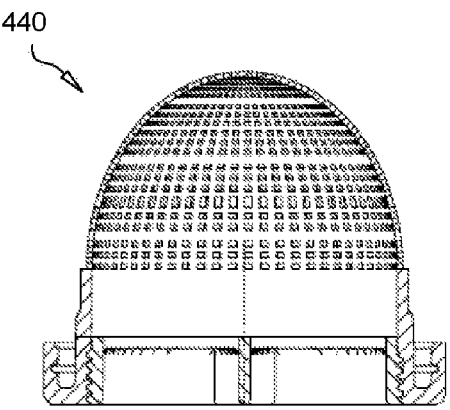
FIG. 4C is a sectioned side perspective view of a filter dome of portable, dual-orifice water dispenser.

FIG. 4B is a side perspective view of a filter dome of portable, dual-orifice water dispenser, and FIG. 4C is a sectioned side perspective view of a filter dome of portable, dual-orifice water dispenser. As shown, the apertures 108.410 are organized into four separate tiers across the top surface of the filter dome 108.

Figure 5:
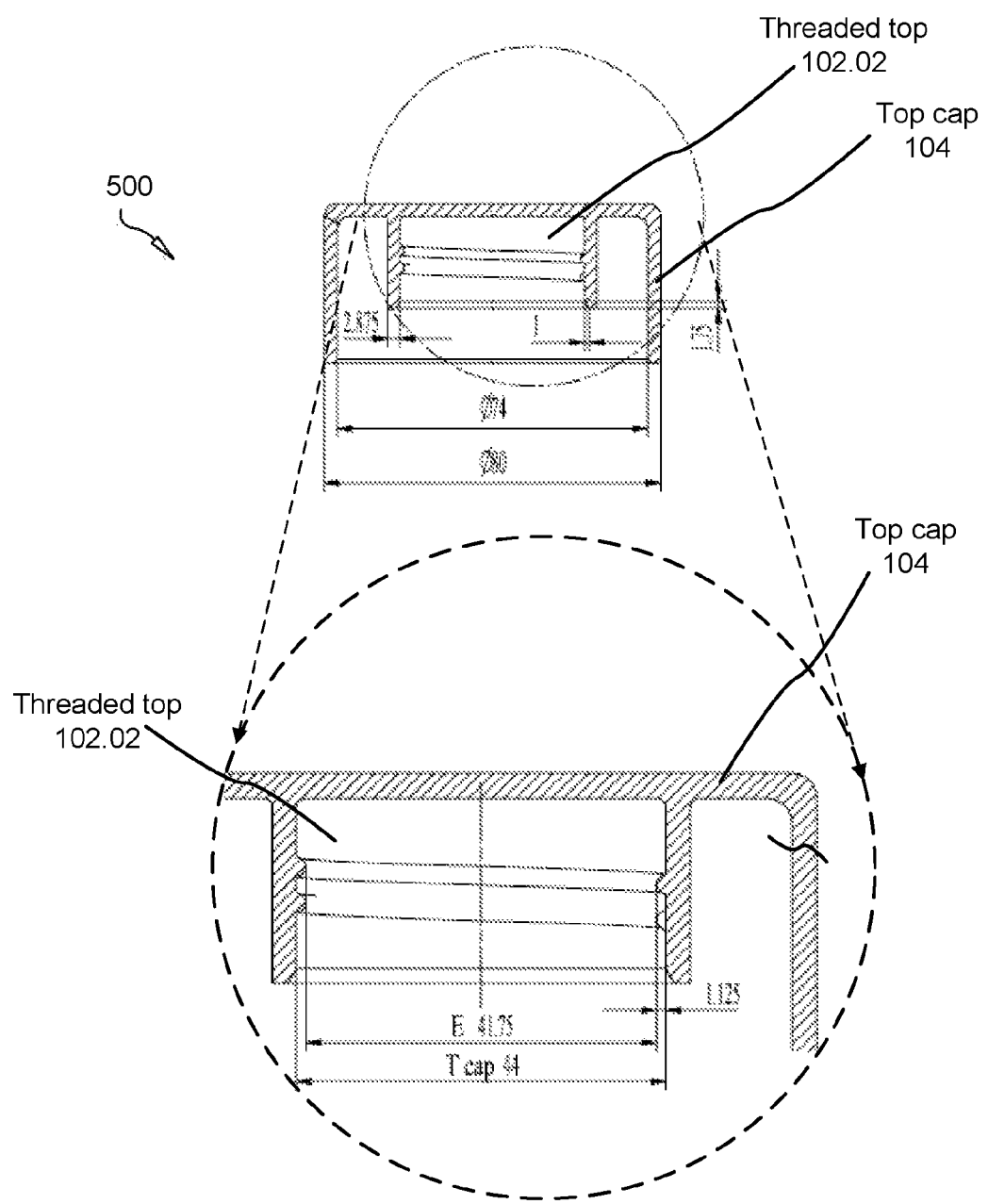
FIG. 5 is a sectioned side perspective view of a top cap of portable, dual-orifice water dispenser with an exploded perspective view.

FIG. 5 is a sectioned side perspective view of a top cap of portable, dual-orifice water dispenser with an exploded perspective view. As shown, the top cap 104 comprises threading which circumscribes the interior recess defined by the top cap 104 for receiving the threaded top 102.102 of the bottle 102.

Figure 6:
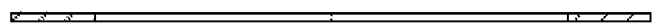
FIG. 6 is a side perspective view of a water bottle gasket of portable, dual-orifice water dispenser.

FIG. 6 is a side perspective view of a water bottle gasket of portable, dual-orifice water dispenser. As shown, the gasket 600 comprises a water bottle gasket 110 which is comprises a flexible annular ring for forming a watertight seal between the keyway insert 106 and the bottom cap 112. The diameter of the gasket 600 is equal to or slightly less than the diameter of the interior recess formed by the bottom cap 112.

Figure 7A:
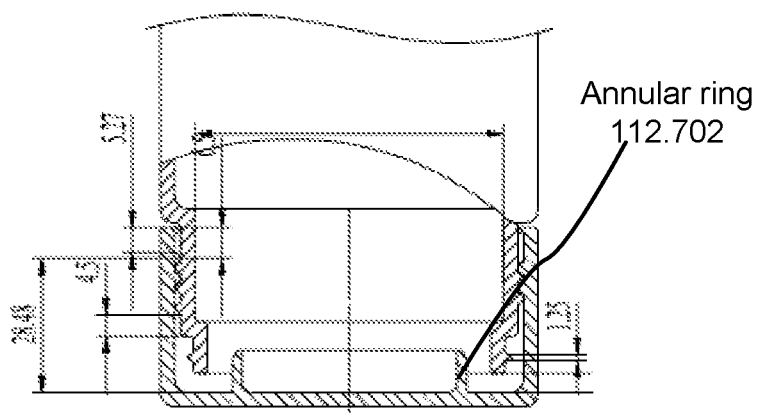
FIG. 7A is a sectioned side perspective view of a bottom cap of portable, dual-orifice water dispenser.
Figure 7B:
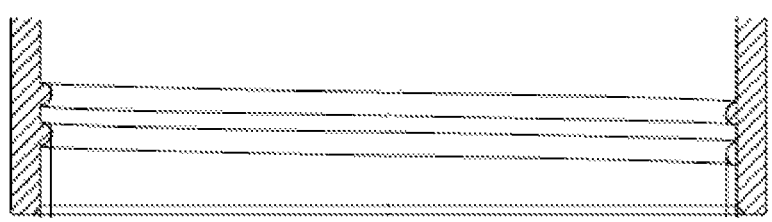
FIG. 7B is a sectioned side perspective view of a bottom cap of portable, dual-orifice water dispenser.

FIGS. 7A and 7B are sectioned side perspective view of a bottom cap of portable, dual-orifice water dispenser. As shown, the bottom cap 700 comprises the bottom cap 112. In various embodiments, the bottom cap 700 comprises an annular ring 112.702 protruding upwardly into the interior recess defined by the bottom cap 700.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable water dispenser, the water dispenser comprising:
    a transparent cylindrical bottle member defining two open ends having a threaded top, a threaded bottom, and a first diameter, the cylindrical bottle member narrowing at the threaded top and the threaded bottom;
    wherein the cylindrical bottle member narrows to a second diameter less than the first diameter at the threaded bottom;
    wherein the cylindrical bottle member narrows to a third diameter less than both the first diameter and the second diameter at the threaded top;
    a top cap for engaging the threaded top and for closing one of the two open ends;
    a dome-shaped water filter;
    a cylindrical keyway insert;
    a water bottle gasket; and
    a bottom cap for engaging the threaded bottom, the bottom cap defining a hollow recess for cupping the dome-shaped water filter, the keyway insert, and the water bottle gasket;
    wherein the bottom cap is detachable for introduction of unfiltered water to the water dispenser;
    wherein each of the dome-shaped water filter, the keyway insert and the water bottle gasket are disposed between the threaded bottom and the bottom cap.

2. The water dispenser of claim 1, wherein the dome-shaped filter defines a plurality of apertures for filtering water.

3. The water dispenser of claim 1, wherein the keyway insert defines a plurality of apertures for filtering water.

4. The water dispenser of claim 1, wherein the top cap defines a hollow recess for receiving the threaded top.

5. The water dispenser of claim 1, wherein the dome-shaped filter defines an open base end circumscribed by an annular flange, the annular flange interiorly-threaded for mating with exterior threading on an exterior of the keyway insert.

6. The water dispenser of claim 5, wherein the keyway insert defines an open end traversed by a cross member for engaging the fingers of a user and facilitating axial rotations and detachment of the exterior threading from the dome-shaped filter.

7. A portable water dispenser, the water dispenser comprising:
    a transparent cylindrical bottle member defining two open ends having a threaded top and a threaded bottom;
    a top cap for engaging the threaded top and for closing one of the two open ends;
    a cylindrical keyway insert;
    a dome-shaped water filter, defining an open base end circumscribed by an annular flange, the annular flange interiorly-threaded for mating with exterior threading on an exterior of the keyway insert;
    a water bottle gasket; and
    a bottom cap for engaging the threaded bottom, the bottom cap defining a hollow recess for cupping the dome-shaped water filter, the keyway insert, and the water bottle gasket;
    wherein the bottom cap is detachable for introduction of unfiltered water to the water dispenser;
    wherein each of the dome-shaped water filter, the keyway insert and the water bottle gasket are disposed between the threaded bottom and the bottom cap.

8. A portable water dispenser, the water dispenser comprising:
    a transparent cylindrical bottle member defining two open ends having a threaded top and a threaded bottom;
    a top cap;
    a cylindrical keyway insert;
    a dome-shaped water filter, defining an open base end circumscribed by an annular flange, the annular flange interiorly-threaded for mating with exterior threading on an exterior of the keyway insert;
    a bottom cap for engaging the threaded bottom, the bottom cap defining a hollow recess for cupping the dome-shaped water filter and the keyway insert;
    wherein the bottom cap is detachable for introduction of unfiltered water to the water dispenser;
    wherein each of the dome-shaped water filter, the keyway insert and a water bottle gasket are disposed between the threaded bottom and the bottom cap.

* * * * *